US008793874B2

United States Patent
Gram

(10) Patent No.: US 8,793,874 B2
(45) Date of Patent: Aug. 5, 2014

(54) METHOD FOR MANUFACTURING A PETAL VALVE

(76) Inventor: Jes Tougaard Gram, Scottsdale, AZ (US)

(*) Notice: Subject to any disclaimer, the term of this patent is extended or adjusted under 35 U.S.C. 154(b) by 935 days.

(21) Appl. No.: 12/247,929

(22) Filed: Oct. 8, 2008

(65) Prior Publication Data

US 2009/0090006 A1 Apr. 9, 2009

Related U.S. Application Data

(60) Provisional application No. 60/978,377, filed on Oct. 8, 2007.

(51) Int. Cl.
*F16K 15/00* (2006.01)
*F16K 1/36* (2006.01)

(52) U.S. Cl.
USPC .............. 29/890.12; 29/890.124; 29/890.127; 137/517; 137/849; 137/852; 251/358

(58) Field of Classification Search
USPC ......... 29/890.12, 890.127, 890.124; 137/332, 137/460, 512.15, 516.25, 517, 519, 533.12, 137/843, 849, 852; 251/364, 358, 342; 264/294; 222/494, 212
See application file for complete search history.

(56) References Cited

U.S. PATENT DOCUMENTS

| | | | | | |
|---|---|---|---|---|---|
| 996,588 | A | * | 6/1911 | Kennedy | 137/515.7 |
| 2,688,979 | A | * | 9/1954 | Kendrick | 137/512.15 |
| 3,717,883 | A | * | 2/1973 | Mosher | 623/2.17 |
| 4,375,825 | A | * | 3/1983 | Greenspan | 137/852 |
| 4,434,810 | A | * | 3/1984 | Atkinson | 137/493 |
| 4,936,493 | A | * | 6/1990 | Foster et al. | 222/209 |
| 5,303,937 | A | * | 4/1994 | Huss et al. | 277/500 |
| 5,385,140 | A | * | 1/1995 | Smith | 128/200.23 |
| 5,743,443 | A | | 4/1998 | Hins | |
| 5,989,469 | A | * | 11/1999 | Dirr | 264/255 |
| 6,230,940 | B1 | * | 5/2001 | Manning et al. | 222/185.1 |
| 6,279,783 | B1 | * | 8/2001 | Brown et al. | 222/185.1 |
| 6,427,874 | B2 | * | 8/2002 | Brown et al. | 222/185.1 |
| 6,726,063 | B2 | | 4/2004 | Stull et al. | |
| 7,182,093 | B2 | * | 2/2007 | Call et al. | 137/15.18 |
| 7,510,676 | B2 | * | 3/2009 | Eimer | 264/295 |
| 8,074,642 | B2 | * | 12/2011 | Bruce et al. | 128/200.23 |
| 2005/0081921 | A1 | * | 4/2005 | Blake et al. | 137/512.15 |
| 2006/0138179 | A1 | | 6/2006 | Suffa | |

* cited by examiner

*Primary Examiner* — Alexander P Taousakis
(74) *Attorney, Agent, or Firm* — Edward J. Chalfie

(57) ABSTRACT

A method for the production of a valve is provided comprising molding a valve body with a first mold, preloading the valve body with a second mold, molding a sealing portion in an open position onto the valve body, and releasing the preloaded valve body. The sealing portion enters a closed position when the preloaded valve body is released. When the valve is in use, the sealing portion opens when under a fluid pressure, and closes when the pressure is released.

7 Claims, 15 Drawing Sheets

Different Versions of Detail A

Seen From the Top

Seen From the Side

Seen From the Top

Seen From the Side

Pressure

Pressure

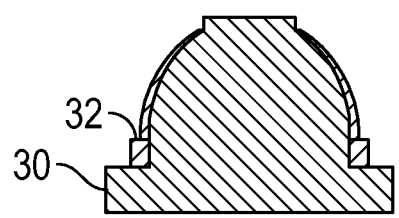 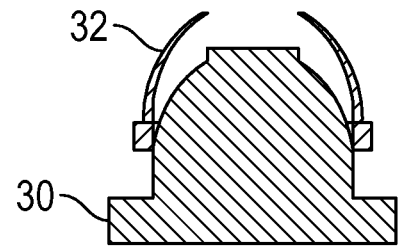
FIG. 37    FIG. 38
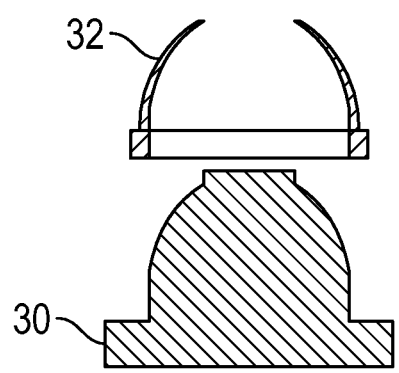 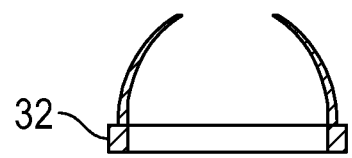
FIG. 39    FIG. 40

METHOD FOR MANUFACTURING A PETAL VALVE

CROSS REFERENCE TO RELATED APPLICATIONS

This application claims priority to U.S. Provisional Patent Application No. 60/978,377 filed Oct. 8, 2007 titled "Elastomeric Valve and Apparatus and Method for Making Same"

FIELD OF THE INVENTION

The present invention relates generally to valves and more particularly to methods of making a petal valve such that the opening of the valve is formed during the molding of the valve and the opening of the valve is formed in an open position.

BACKGROUND OF THE INVENTION

Soft plastic, such as silicone or a thermoplastic elastomer can be used to make a petal valve. Traditionally, to make such a valve, the soft valve body is molded and then ejected from a molding tool. Then, the molded material is punched or sliced to form an X-opening. Forming the X-opening after the molding process adds an extra step to the process of making a petal valve and accordingly adds to the cost of making such a valve.

Previously, it has not been practical to form the X-opening in the valve body during the molding process of the valve body because openings formed by a tool during the molding process would likely be too large to permit effective sealing of the valve. When petal valves or component parts with a petal valve function are made, it is important that the sealing petals or lips can close tightly together after opening without the need for significant compression in the sealing area.

There is thus a continuing, ongoing need for a method of making a petal valve such that the opening of the valve can be made during the molding process and can be made in a open position. Additionally, there is a need for a petal valve with an opening that separates when under fluid pressure and closes to seal the opening against flow when the fluid pressure is relieved.

BRIEF DESCRIPTION OF THE DRAWINGS

Various examples of objects, features and attendant advantages of the present invention will become fully appreciated as the same becomes better understood when considered in conjunction with the accompanying drawings, wherein:

FIG. 37 is a side view of a core for valve configuration with a molded substantially rigid valve skeleton thereon in accordance with the present invention;

FIG. 38 is a side view of a core for valve configuration with a molded substantially rigid valve skeleton partially released therefrom in accordance with the present invention;

FIG. 39 is a side view of a core for valve configuration with a molded substantially rigid valve skeleton fully released therefrom in accordance with the present invention;

FIG. 40 is a side view of molded substantially rigid valve skeleton in accordance with the present invention;

FIG. 57 is a side view of a valve where the sealing portion has been over molded with a substantially rigid material in its closed position.

DETAILED DESCRIPTION OF THE INVENTION

Figure 2:
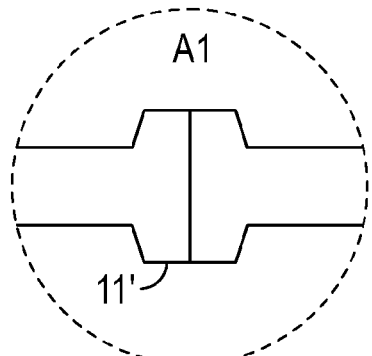
FIG. 2 is a cross-section of a valve sealing lip configuration with a large sealing surface area in accordance with the present invention.

While the present invention is susceptible to embodiments in various forms, there is shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include a petal valve with an opening that can separate when under fluid pressure and can close to seal the opening against flow when the fluid pressure is relieved. Further embodiments include a method of making a petal valve such that the opening of the valve can be made during the molding process while in an open position.

A valve in accordance with the present invention can be a resilient one-way valve that can be used, for example, for dispensing household, cosmetic and personal care liquids, lotions or gels or can be used, for example, in medical and industrial fluid transfer applications. Valves in accordance with the present invention can be made of a soft plastic, for example, a silicone or a thermoplastic elastomer.

A valve in accordance with the present invention, can be molded inside out and then reversed so as to be functional after molding is complete. To achieve such molding, a molding assembly that reverses the valve can be used to support and keep the new geometry of the valve and to ensure that the valve stays in its working position geometry once reversed. In preferred embodiments, after a valve is reversed into its working position, the valve can be overmolded with a substantially rigid material to lock the valve in its working position. The valve can be overmolded while it is still in a first mold.

Figure 6:
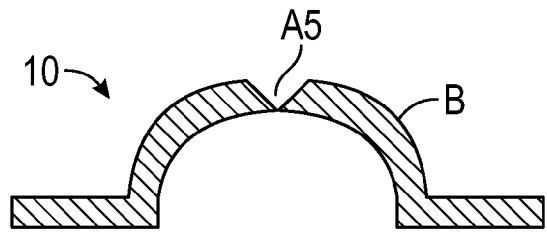
FIG. 6 is a cross-section of a valve molded in an open valve position in accordance with the present invention.
Figure 8:
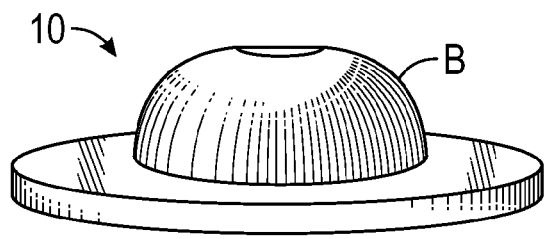
FIG. 8 is a side view of a valve molded in an open valve position in accordance with the present invention.

In accordance with this embodiment of the present invention, a valve can be molded with the petals of the valve opening in an open position within the opening of the valve A5 molded within the elastomeric material B. FIG. 6 is a cross-section of a valve 10 in an open valve position, and FIG. 8 is a side view of the valve in an open position. By molding the valve in an open position, the petals of the valve opening A5 can be configured during the molding process to seal against fluid flow when they are in a closed position. Further, when the valve is molded in an open position, the sealing configurations as seen and described with respect to FIGS. 2-4 can be molded.

Figure 3:
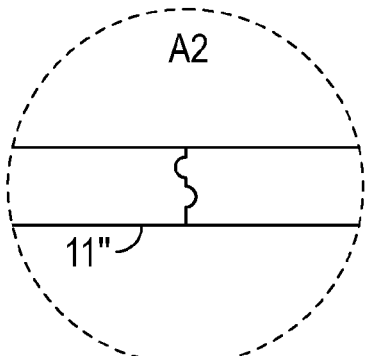
FIG. 3 is a cross-section of a valve sealing lip configuration incorporating a trap/zipper function in accordance with the present invention.
Figure 4:
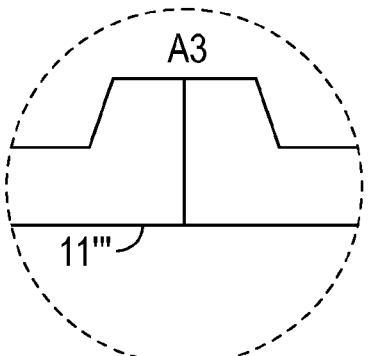
FIG. 4 is a cross-section of a valve sealing lip configuration incorporating a directional valve function/flow in accordance with the present invention.
Figure 1:
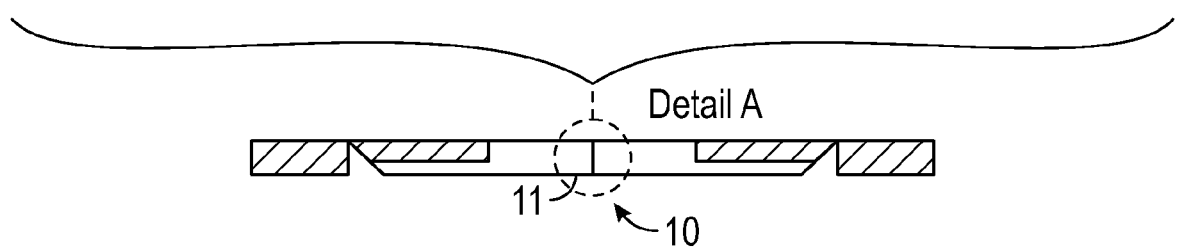
FIG. 1 is a cross-section of a valve in accordance with the present invention.
Figure 5:
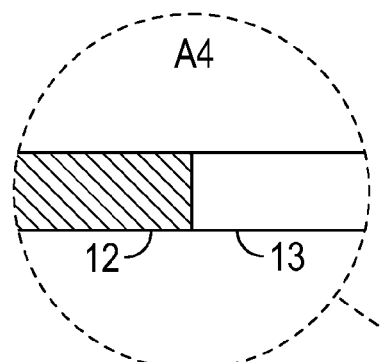
FIG. 5 is a cross-section of a valve sealing lip configuration incorporating a substantially rigid material in accordance with the present invention.
Figure 5:
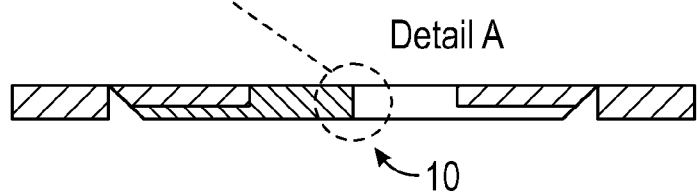

The sealing boundaries of the petals can be configured to be flat. In alternate embodiments, the sealing boundaries of the petals can have complimentary shapes to further enhance the seal between the petals when they are in a closed position. FIG. 1 is a cross-section of a valve 10 in accordance with the present invention with sealing lips 11 in a closed position. As can be seen in FIGS. 2-4, the valve sealing lip configuration can be formed to increase the surface of the sealing area (FIG. 2), to enable a trap/zipper function (FIG. 3), or to enable a directional valve function flow (FIG. 4). When a trap/zipper function is enabled as seen in FIG. 3, the sealing effect of the valve is further enhanced.

In embodiments of the present invention as shown in FIG. 2, the petals can be molded so that the surface area of the sealing region has a greater thickness than the thickness of the body of the valve. The added thickness of the petals can reinforce the sealing function of the valve to achieve a unique valve that, for example, has a larger sealing contact area or has a special design for the intended flow pattern or special trap features. The added thickness can also allow adjustments to be made to the fluid force needed to open a valve by adding material in the sealing area on either the upstream or downstream side of the valve.

In embodiments of the present invention as shown in FIG. 3, sealing petals of the valve can have grooves or protrusions that interlock in the sealing area. Such interlocking creates sealing traps to enhance the sealing feature of the valve.

Figure 7:
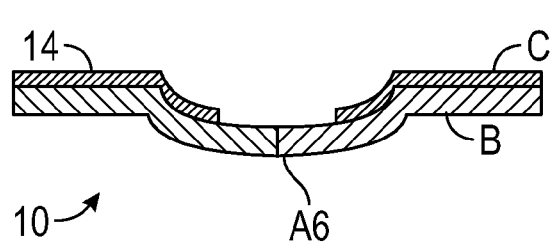
FIG. 7 is a cross section of a valve reversed or bent into a closed valve position in accordance with the present invention.
Figure 9:
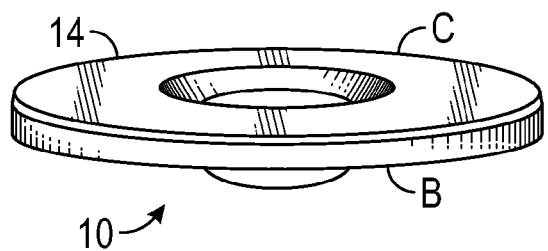
FIG. 9 is a perspective view of a valve reversed or bent into a closed valve position in accordance with the present invention.

After the valve 10 is molded in the open position, the valve 10 can be reversed or bent into a closed valve position to enable to the closing of the sealing configurations of the valve petals. FIG. 7 is a cross-section of a valve 10 reversed or bent into a closed valve position showing elastomeric material B and skeletal structure 14, and FIG. 9 is a perspective view of the valve in a closed position. As seen in FIG. 7, the reversed valve 10 can be kept in place by a substantially rigid skeleton 14 that can be molded of a rigid material C, such as plastic (of types well known to persons having ordinary skill in the art), onto elastomeric material B or assembled onto the valve after molding to ensure proper functioning of the valve. It will be seen that various embodiments of this type of valve are shown in FIGS. 10-15, with similar elements identified with similar numbers and letters.

Figure 56:
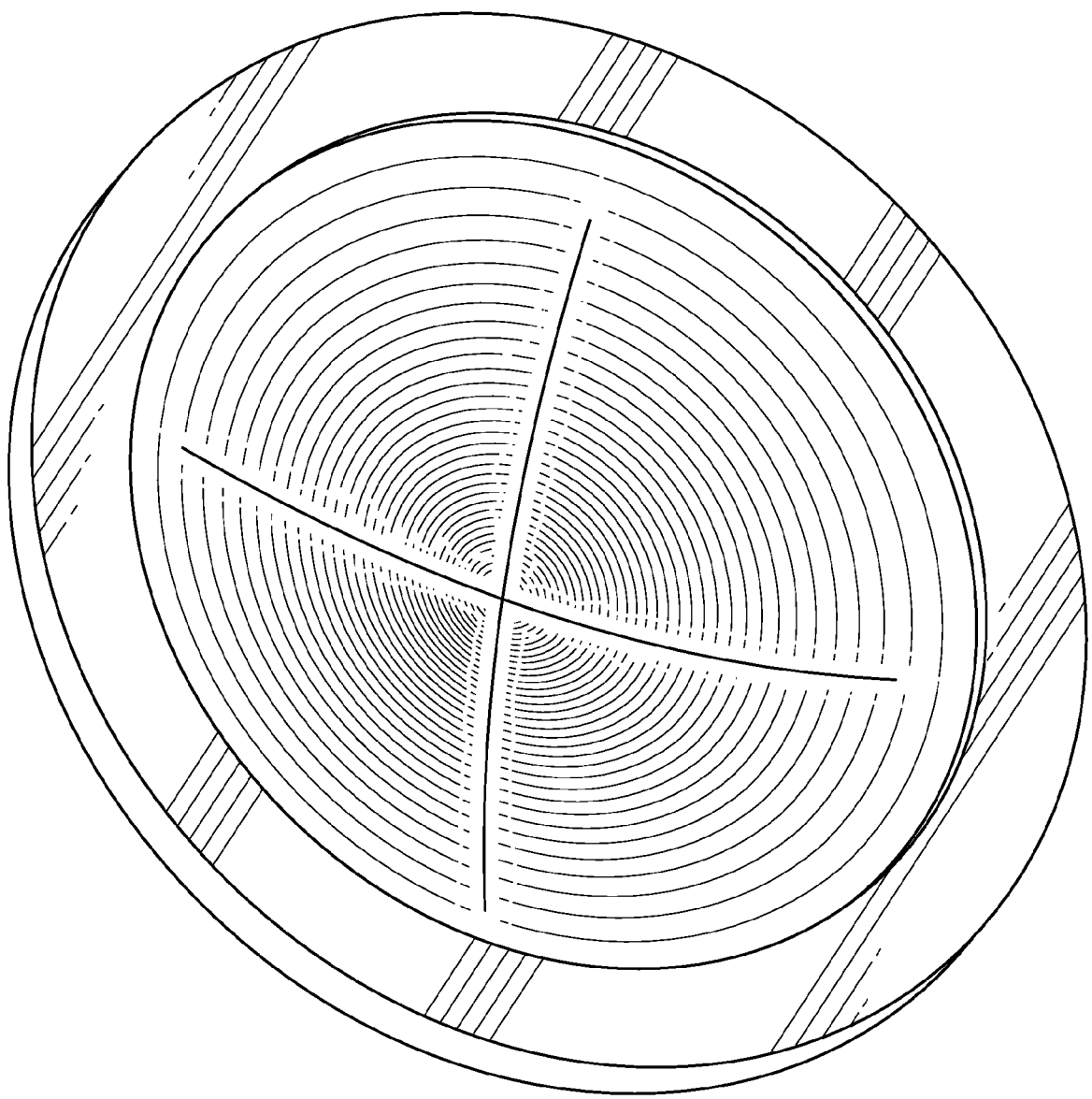
FIG. 56 is a side view of a valve where the sealing portion has been closed.

FIGS. 48-55 show a cross-section of a valve 10 in accordance with the present invention first in an open position and then reversed with the use of a substantially rigid skeleton 14. As explained above, when the valve is in the open position, different sealing configurations of the valve lips can be achieved before the valve is closed. FIGS. 56 and 57 show perspective views of 2 configurations of these valves.

Figure 16:
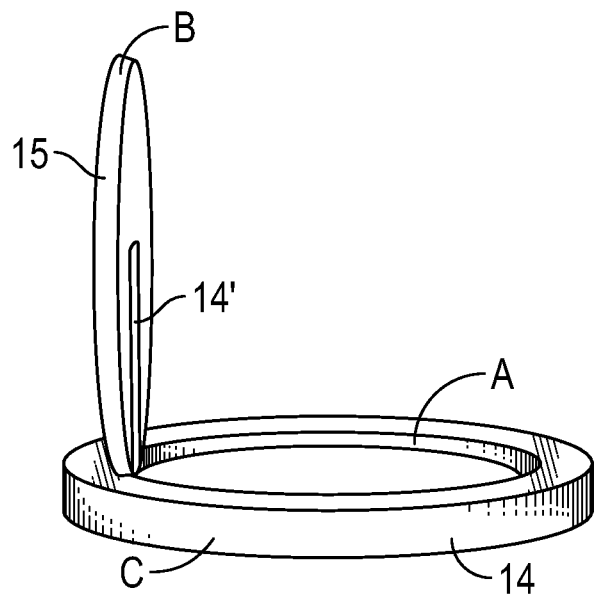
FIG. 16 is a side view of a of an open valve made from non-compatible material in accordance with the present invention.

A valve in accordance with the present invention can alternatively have a locking feature built into the valve, for example a snap 14'. The valve in this embodiment, as shown in FIG. 16, can be, for example, one component or multiple components. The locking feature can aid in reversing the valve from an open position to a closed position and keep the valve securely in the locking position once reversed. In some embodiments, the locking feature can be the material of the valve, and in other embodiments the locking feature can include a rigid skeleton or skeletal structure made of the rigid material "C".

Figure 17:
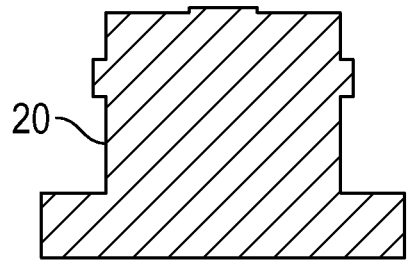
FIG. 17 is a side view of a core for molding a valve in accordance with the present invention.
Figure 18:
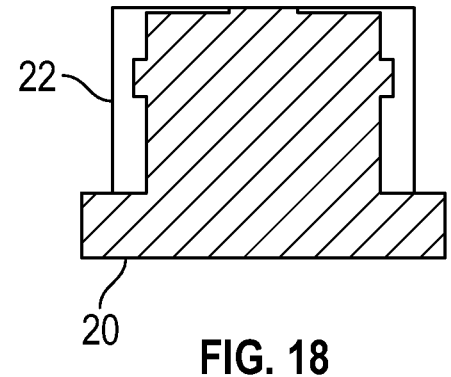
FIG. 18 is a side view of a core for molding a valve with a molded valve body thereon in accordance with the present invention.
Figure 19:
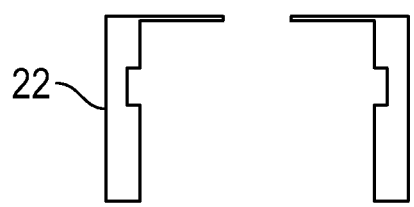
FIG. 19 is a side view of a molded valve body in accordance with the present invention.
Figure 20:
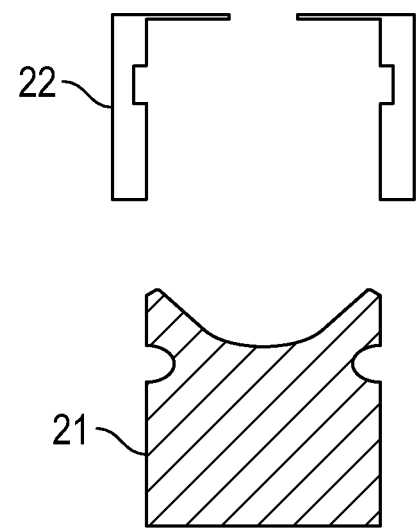
FIG. 20 is a side view of a molded valve body and a second core in accordance with the present invention.
Figure 21:
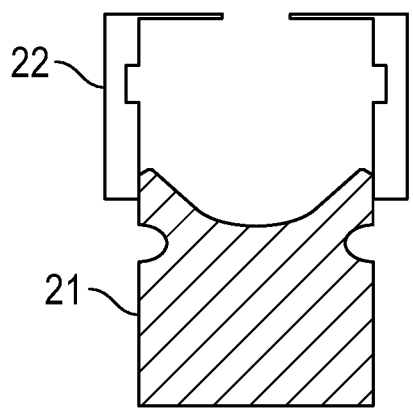
FIG. 21 is a side view of a second core entering a molded valve body in accordance with the present invention.
Figure 22:
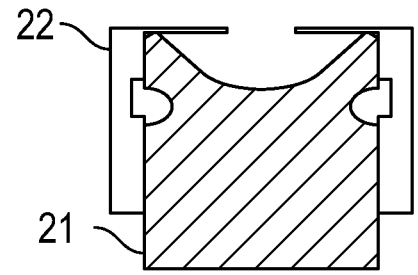
FIG. 22 is a side view of a second core in a molded valve body in accordance with the present invention.
Figure 23:
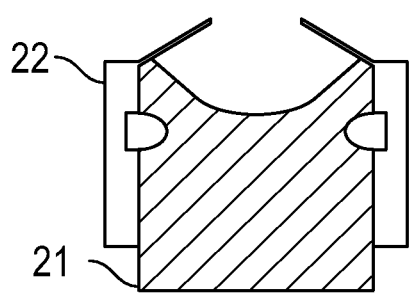
FIG. 23 is a side view of a second core bending or preloading part of a molded valve body in accordance with the present invention.
Figure 24:
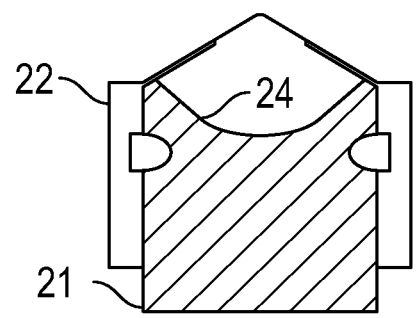
FIG. 24 is a side view of a second core in a preloaded molded valve body and molding a sealing portion in accordance with the present invention.

In other embodiments of the present invention, a valve can be molded in a functional direction with the use of molding cores and overmolding. Referring to FIG. 17, a side view of a core 20 for valve configuration is shown. As seen in FIG. 18, a valve body 22 can be molded onto the core 20. FIG. 19 shows the molded valve body 22 removed from the core. FIGS. 20-22 show a second core 21 entering the molded valve body 22. As seen in FIG. 23, the second core 21 can bend or preload part of the substantially rigid molded valve body 22. Referring to FIG. 24, the sealing portion 24 can be molded when the second mold 21 is inside of the molded valve body 22.

Figure 25:
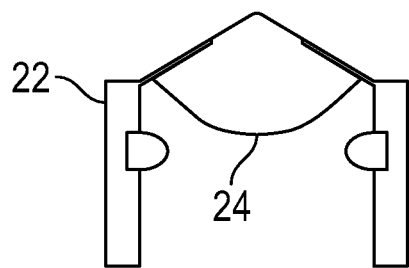
FIG. 25 is a side view of the preloaded molded valve body and a sealing portion in accordance with the present invention.
Figure 26:
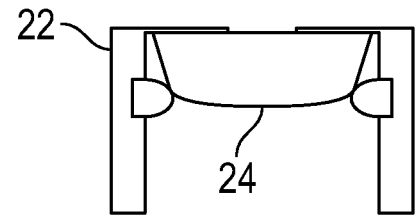
FIG. 26 is a side view of a released molded valve body and a sealing portion in a closed position in accordance with the present invention.
Figure 27:
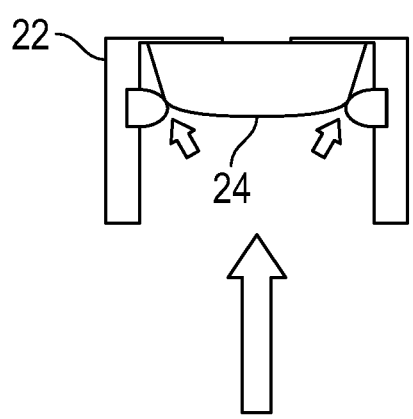
FIG. 27 is a side view of a molded valve body and sealing portion in a closed position under pressure.
Figure 28:
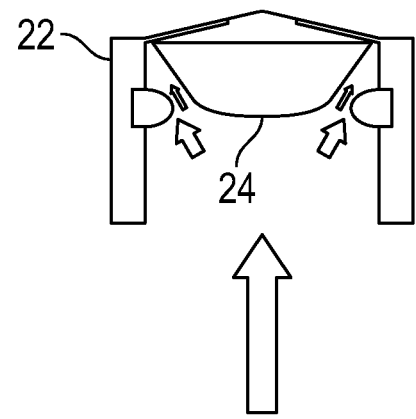
FIG. 28 is a side view of a molded valve body and sealing portion in a partially open position under pressure in accordance with the present invention.
Figure 29:
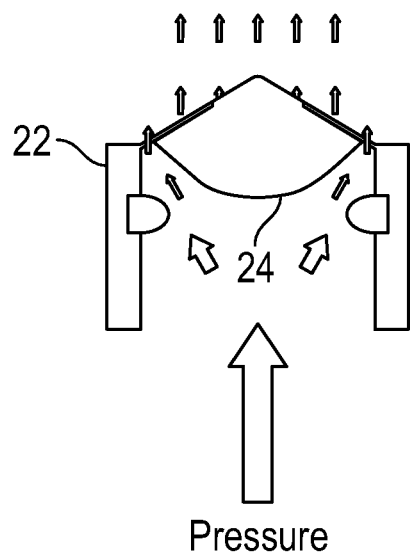
FIG. 29 is a side view of a molded valve body and sealing portion in a fully open position under pressure in accordance with the present invention.
Figure 30:
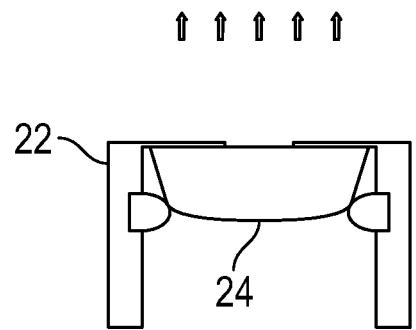
FIG. 30 is a side view of a molded valve body and sealing portion in a closed position in accordance with the present invention.
Figure 31:
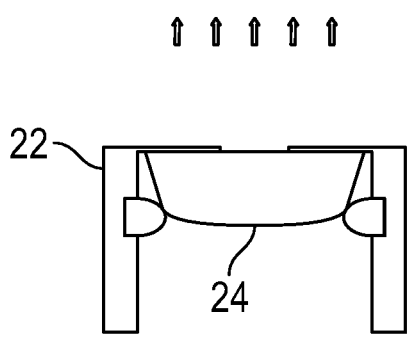
FIG. 31 is a side view of a molded valve body and sealing portion in a closed position in accordance with the present invention.

FIG. 25 shows the molded valve body and the sealing portion before the bent or preloaded part of the substantially rigid part of the valve body is released. In FIG. 26, the bent or preloaded part of the substantially rigid part of the valve body is released and the valve is in a closed position.

Referring to FIGS. 27-31, a side view a molded valve body and sealing portion are shown. When the sealing portion is under pressure, the sealing portion opens. When pressure is released, the sealing portion returns to a closed position.

Figure 32:
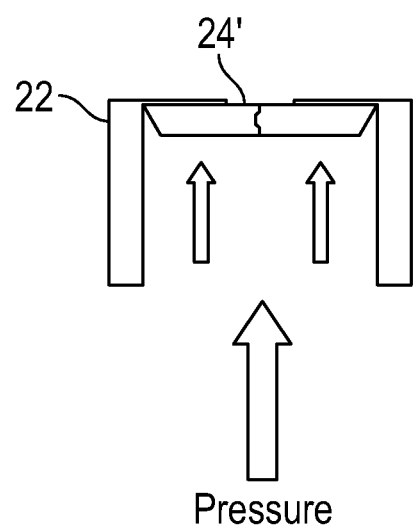
FIG. 32 is a side view of a molded valve body and a sealing portion with a center valve in a closed position under pressure in accordance with the present invention.
Figure 33:
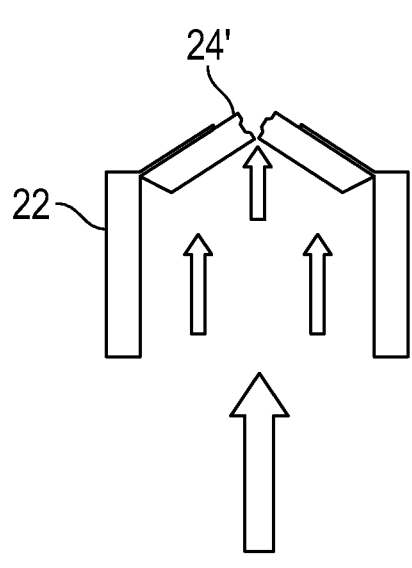
FIG. 33 is a side view of a molded valve body and sealing portion with a center valve in a partially open position under pressure in accordance with the present invention.
Figure 34:
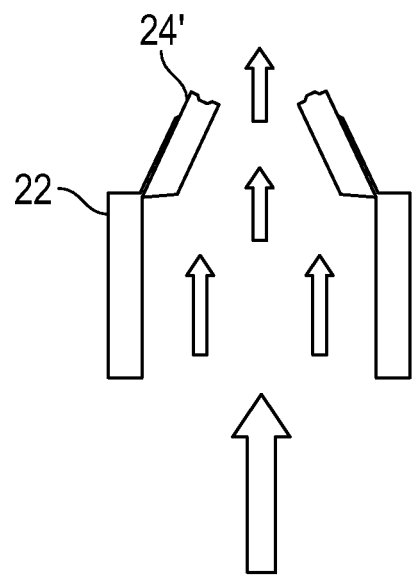
FIG. 34 is a side view of a molded valve body and a sealing portion with a center valve in a fully open position under pressure in accordance with the present invention.
Figure 35:
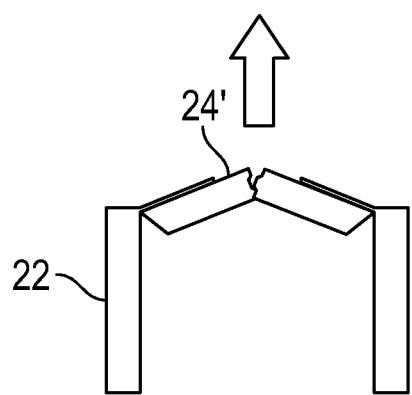
FIG. 35 is a side view of a molded valve body and a sealing portion with a center valve in a closed position in accordance with the present invention.

An alternate embodiment of a molded valve body and sealing portion is shown in FIGS. 32-35. In this embodiment, the sealing portion includes a center opening with a trap feature. As seen in FIG. 32, the sealing portion starts in a closed position. When under pressure, the sealing portion opens, and when the pressure is released, the sealing portion returns to a closed position.

When an overmolding process as described above is incorporated into methods in accordance with the present invention, shrinkage of the overmolded material may occur and provide for additional advantages of extra compression and/or sealing in the valve. For example, a second shot of molded plastic material may be used to strengthen the valve body to ensure that the valve remains in its working configuration. Those of skill in the art will know that if the proper material for the second shot is used and shrinkage of the second shot material is calculated correctly, the sealing petals can meet from this feature alone. Similarly, if the area of the steel portion or core that separates the sealing petals in the first molding is overcome by the shrinkage of the material from the second molding, then those of skill in the art will know that it is possible to make the valve opening seal only by using this process.

Other methods of securing the valve in its sealing position include, for example, snap assembly, coining, or using adhesives, or welding techniques to join the valve to a support frame, such as a cap, or a retaining ring for later assembly in various products needing a valve structure.

In embodiments of the present invention, a valve is molded with a core having a reversed dome where the angle of the steel or core forming the valve portion is calculated to seal when the valve is reversed in its assembly position. The position of the reversed dome arch makes the sealing of the valve structure possible in a closed position.

Support ribs of a substantially rigid material can be molded to an area near the sealing petals. Such support ribs can enhance the sealing, opening, and closing of the valve. In alternate embodiments, a support structure or skeleton of a substantially rigid material can be molded onto the valve or the valve can be molded onto a substantially rigid skeleton. Such a support skeleton can aid in controlling the sealing petals and the functioning of the valve when in use. Specifically, a support skeleton can ensure that the sealing petals of the valve return to a closed position even when the thickness of the petals is thin. A support skeleton can also ensure that the valve does not return to its reversed position if it had been molded in the reversed position. Substantially rigid materials that can be used for support ribs or a support skeleton, include, for example, a polypropylene.

Figure 10:
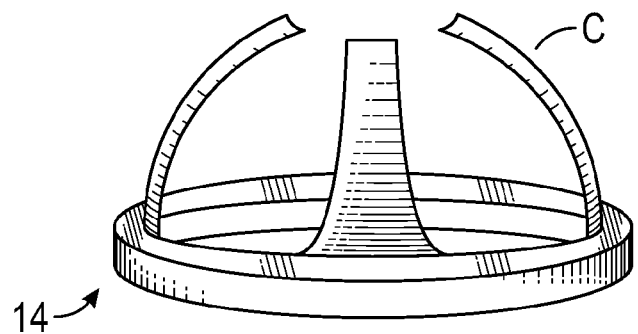
FIG. 10 is a substantially rigid skeleton material in accordance with the present invention.
Figure 11:
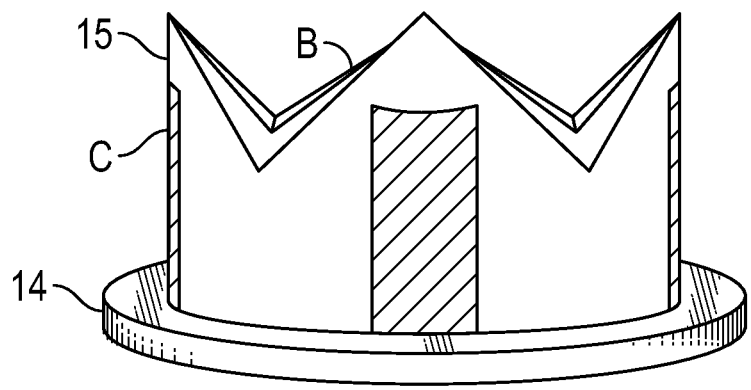
FIG. 11 is a preloaded substantially rigid skeleton material in accordance with the present invention.

Referring to FIG. 10, a substantially rigid skeleton 14, made of rigid material C, is shown. In embodiments of the present invention, the substantially rigid skeleton can be a substantially rigid housing. When a substantially rigid skeleton 14 or housing is employed, the substantially rigid skeleton 14 can be bent or reversed in a mold before molding the valve material B as seen in FIG. 11. Then, the valve material B can be molded, and, upon ejection from the mold, the valve can close. After the valve is molded onto to the substantially rigid skeleton, the skeleton can regain its original molded position and create the finished valve when released from the mold.

Figure 36:
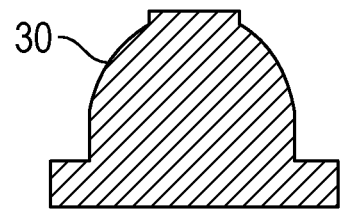
FIG. 36 is a side view of a core for valve configuration in accordance with the present invention.

Embodiments of the present invention in which a valve is molded onto a substantially rigid skeleton are shown in FIGS. 36-47. FIG. 36 is a side view of a core 30 for valve configuration. In FIGS. 37-39, a substantially rigid skeleton 32 is molded onto the core 30 and then released from the core. FIG. 40 is a side view of the substantially rigid skeleton 32 after molding on the core is complete.

Figure 41:
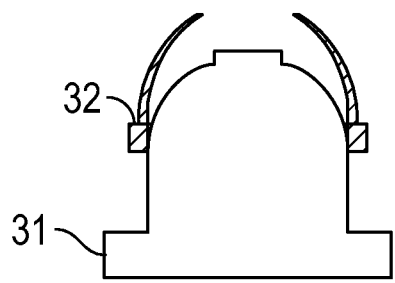
FIG. 41 is a side view of a second core entering a molded substantially rigid valve skeleton in accordance with the present invention.
Figure 42:
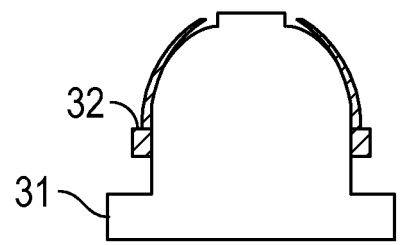
FIG. 42 is a side view of a second core in a molded substantially rigid valve skeleton in accordance with the present invention.
Figure 43:
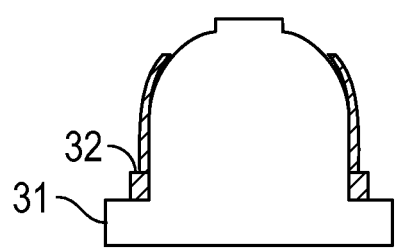
FIG. 43 is a side view of a second core bending or preloading part of a molded substantially rigid valve skeleton in accordance with the present invention.
Figure 44:
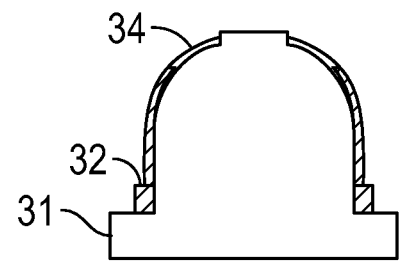
FIG. 44 is a side view of a second core with a preloaded molded substantially rigid valve skeleton thereon and a sealing portion being molded thereon in accordance with the present invention.

As seen in FIG. 41, a second core 31 can enter the substantially rigid skeleton 32. Referring to FIGS. 42-43, when the second core 31 enters the substantially rigid skeleton 32, the second core 31 can bend or preload part of the substantially rigid skeleton 32. After a portion of the substantially rigid skeleton is bent or preloaded with the second core, a sealing portion 34 can be molded onto the preloaded substantially rigid skeleton 32 and the second core 31 as seen in FIG. 44. Then, the second core can be removed from the substantially rigid skeleton 32 and the sealing portion 34.

Figure 45:
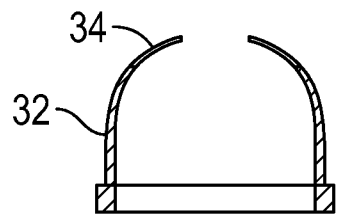
FIG. 45 is a side view of a preloaded molded substantially rigid valve skeleton and a sealing portion in accordance with the present invention.
Figure 46:
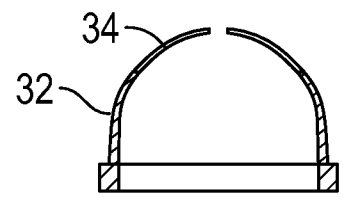
FIG. 46 is a side view of partially preloaded molded substantially rigid valve skeleton and a sealing portion in accordance with the present invention.
Figure 47:
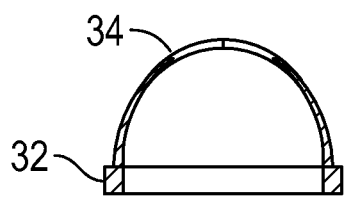
FIG. 47 is a side view of a released molded substantially rigid valve skeleton and a sealing portion in a closed position in accordance with the present invention.
Figure 48:
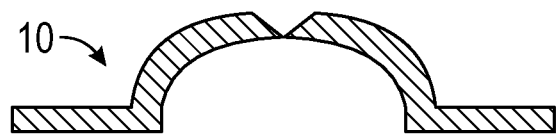
FIG. 48 is a cross-section of a valve in an open position in accordance with the present invention.
Figure 49:
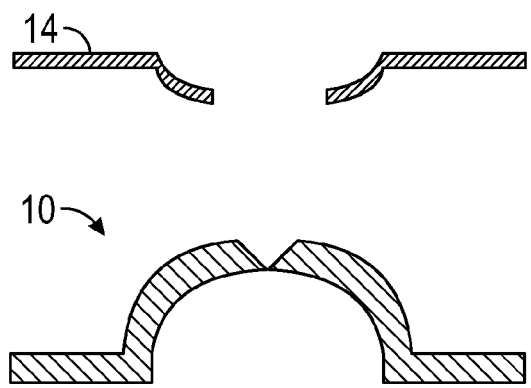
FIG. 49 is a cross-section of a valve in an open position and a substantially rigid skeleton in accordance with the present invention.
Figure 50:
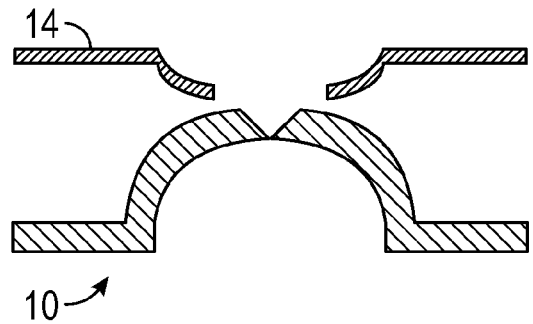
FIG. 50 is a cross-section of substantially rigid skeleton approaching a valve in an open position in accordance with the present invention.
Figure 51:
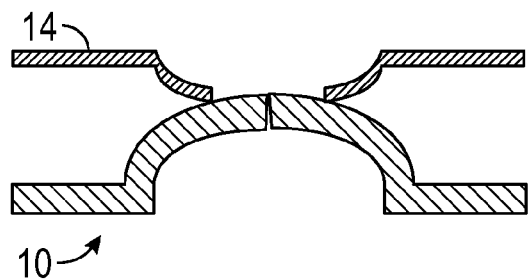
FIG. 51 is a cross-section of a substantially rigid skeleton closing a valve in accordance with the present invention.
Figure 52:
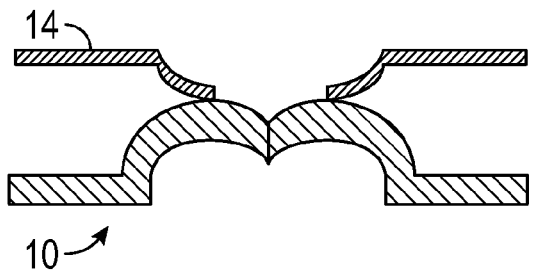
FIG. 52 is a cross-section of a substantially rigid skeleton closing a valve in accordance with the present invention.
Figure 53:
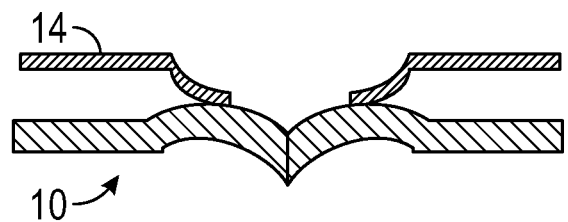
FIG. 53 is a cross-section of a substantially rigid skeleton closing a valve in accordance with the present invention.
Figure 54:
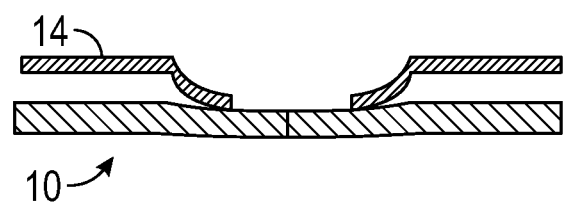
FIG. 54 is a cross-section of a substantially rigid skeleton closing a valve in accordance with the present invention.
Figure 55:
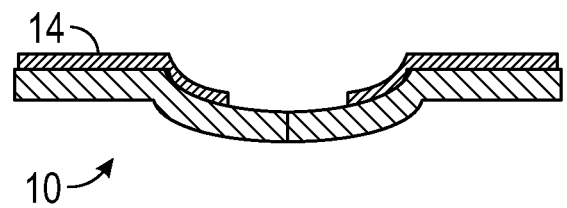
FIG. 55 is a cross-section of a substantially rigid skeleton holding a valve in a closed position in accordance with the present invention.

FIG. 45 shows a side view of the substantially rigid skeleton 32 and the sealing portion 34 before the preloaded part of the substantially rigid skeleton is released. In FIG. 46, the preloaded part of the substantially rigid skeleton 32 is partially released, and in FIG. 47, the preloaded part of the substantially rigid skeleton 32 is fully released. When the substantially rigid part of the molded skeleton is released, the valve achieves a closed position.

The spring effect of the support skeleton can be improved to ensure that it will return to its molded position when the preload is released after molding a flexible sealing material and thus, completing the valve. Such improvements can be achieved by adding, for example, glass fiber or other enhancement fillers into the support skeleton.

A substantially rigid skeleton in accordance with the present invention preferably are made from materials, C, that can adapt to the heat and high temperature that will surround the skeleton when it is overmolded with, for example, LSR (Liquid Silicone Rubber), natural rubber, or any other material that must be baked or heated to solidify. The substantially rigid skeleton can work in hostile surroundings.

Figure 12:
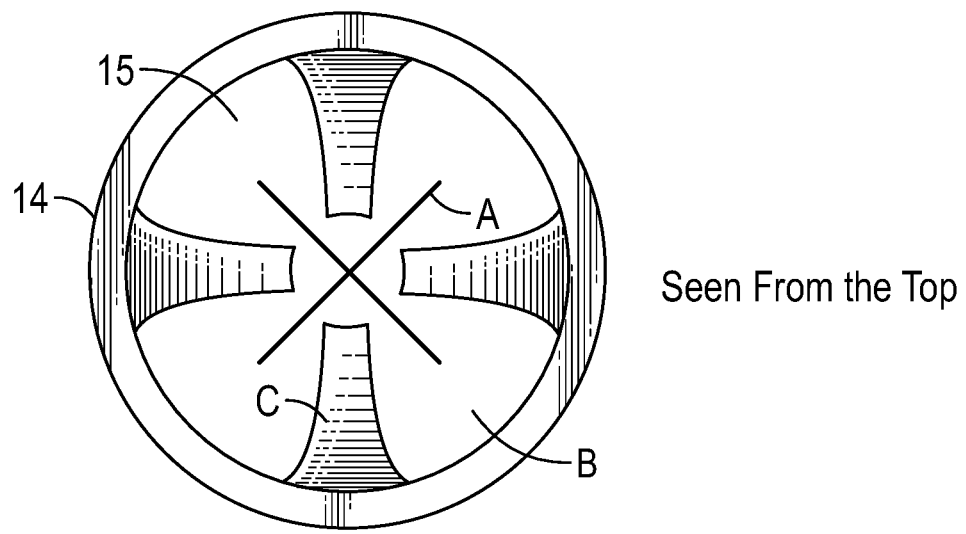
FIG. 12 is a top view of a molded valve in a closed position in accordance with the present invention.
Figure 13:
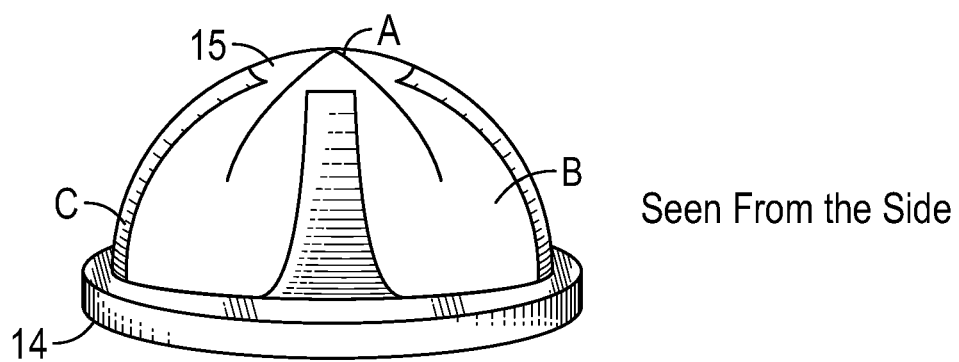
FIG. 13 is a side view of a molded valve in a closed position in accordance with the present invention.

In embodiments of the claimed invention, the sealing petals of the valve can be molded in an open position and then formed in a closed position before a second molding. In such embodiments, a substantially rigid skeleton of the second molding can enable the valve to stay in a closed position when ejected from the mold. FIG. 12 is a top view of the valve in a closed position with a substantially rigid skeleton, and FIG. 13 is a side view of the valve in a closed position with the substantially rigid skeleton supporting the sealing area of the valve. The support of the substantially rigid skeleton helps to control the opening and closing function of the valve and also enables a thinner wall thickness of the sealing area.

In some embodiments, the flow direction of the valve can be in the same direction as the valve when the valve is reversed. In other embodiments, the flow direction of the valve can be in the opposite direction.

Embodiments of the present invention include sealing petals that have support ribs on the back side, the front side, and/or on the inside of the sealing area. Such support ribs can give the sealing petals strength as well as minimize the use of expensive sealing and valve material by allowing for thinner wall thickness compared to the amount of material and wall thickness traditionally required in valves known by those of ordinary skill in the art to give the necessary sealing effect.

Figure 14:
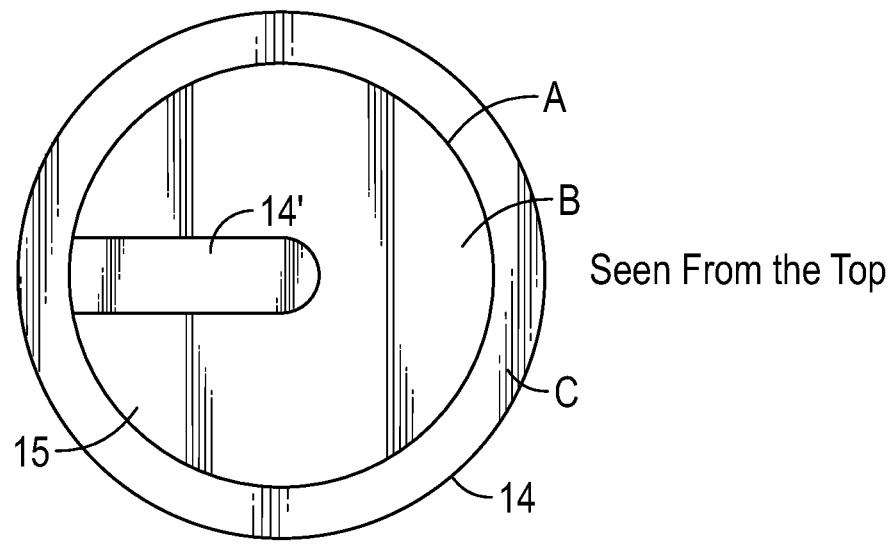
FIG. 14 is a top view of a directional flow valve in accordance with the present invention.
Figure 15:
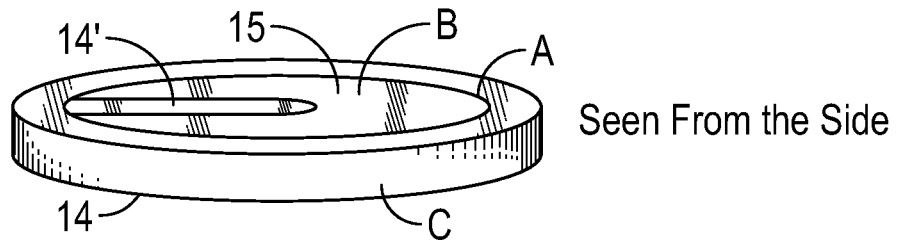
FIG. 15 is a side view of a directional flow valve in accordance with the present invention.

Referring to FIGS. 14-16, in FIG. 14, a top view of a valve configuration is shown where the sealing area is created between the edges of the substantially rigid skeleton material 14 and the sealing material 15. FIG. 15 is a side view of the valve configuration shown in FIG. 14. An overlapping stop of the substantially rigid skeleton 14' can create a directional valve that can only open in one direction and can be sealed extremely tight when the flow reverses. In this embodiment, the opening in the sealing area is larger, which allows for larger flow volumes as seen in FIG. 16. Additionally, the round sealing properties allow for better sealing properties when other devices are connected through the valve. In this embodiment of the present invention, it is preferred to have multiple attachment points (not shown) between the substantially rigid skeleton and the sealing material.

Referring to FIG. 14, a top view of a valve configuration is shown where the sealing area is created between the edges of the substantially rigid skeleton material 14 and the sealing material 15. FIG. 15 is a side view of the valve configuration shown in FIG. 14. An overlapping stop of the substantially rigid skeleton 14' can create a directional valve that can only open in one direction and can be sealed extremely tight when the flow reverses. In this embodiment, the opening in the sealing area is larger, which allows for larger flow volumes as seen in FIG. 16. Additionally, the round sealing properties allow for better sealing properties when other devices are connected through the valve. In this embodiment of the present invention, it is preferred to have multiple attachment points (not shown) between the substantially rigid skeleton and the sealing material.

In embodiments where the sealing properties of the valve are not of high importance, a valve can be made using a substantially rigid material alone or with a blend of substantially rigid and elastomeric materials. When a substantially rigid material is used, it is possible to build a locking feature into a valve keeping the valve structure in place when reversed to its sealing position. Such valves could be used in connection with, for example, containers and closures in a one component material configuration with a valve structure.

A substantially rigid skeleton can also be molded with a spring feature by, for example, adding glass fiber reinforcement into the material blend (e.g. polypropylene) and then overmolding the preloading or reversed skeleton structure into, for example, a flip top can with a hinge material such as, for example, polypropylene without glass fiber reinforcement. Such processes can keep the materials used in the same category for, for example, recycling purposes. Different material combinations can also be used for performance or cost reasons, for example.

Embodiments of the present invention include a valve comprising at least one material, having a valve opening molded in an open position and with a design that enables the valve to be reversed and/or released into a closed working position before the intended use of the valve.

Further embodiments include a valve comprising a substantially rigid support structure and/or skeleton of a substantially rigid material, for example a plastic or a metal. Part or all of the support structure can be bent and/or preloaded in a mold before a valve material is introduced into the mold. Then, the valve material can be reversed into a sealing position when it is ejected from the mold. The support structure can help to control the sealing lips of the valve and the valve structure when the valve is in use.

Other embodiments include a valve comprising a substantially rigid support structure and/or skeleton and a valve material molded together. The support structure can help to support the valve material and control the sealing lips and the valve structure when the valve is in use.

Even further embodiments of the present invention include molding a valve in which the sealing lips of the valve have grooves and/or protrusions that interlock in the sealing area. The grooves and/or protrusions can create sealing traps to enhance the sealing feature of the valve.

Other embodiments include molding a valve where the sealing lips have a larger sealing surface area as compared to the wall thickness of the surrounding valve material.

Some embodiments include molding a valve where the sealing lips have support ribs incorporated in the sealing area. The support ribs can give the sealing portion strength and also minimize the use of material and wall thickness as compared to the amount of material and wall thickness normally needed to provide the necessary sealing effect.

In embodiments of the present invention, a valve can be molded from two dissimilar materials that do not bond in the molding process. The valve function can be created by at least one contact point between the two materials.

In further embodiments, a valve can be molded where a skeleton of the valve is made from a more rigid material and is bent in a second molding that allows the skeleton to return to its original position after the second molding is complete. Thus, the valve can be closed after the molding process and when ejected from the mold.

Some embodiments include an apparatus and/or mold comprising at least one core and/or cavity that has a geometry capable of bending and/or reversing a previously molded part. An externally manufactured part can be affixed or molded to a rigid plastic or a membrane material, for example, elastomer, rubber, or silicone.

In other embodiments, an apparatus and/or a mold can comprise at least one core and/or cavity having a geometry capable of being activated and/or moved into a closed molding tool, which can bend and/or reverse a previously molded or an externally manufactured part before a rigid plastic or a membrane material, for example, elastomer, rubber, or silicone, is molded thereto.

Further embodiments of the present invention include molding a valve consisting of a substantially rigid material and a sealing material such that the valve sealing portion is created between the two materials, i.e. between a hard and soft/flexible material.

Still further embodiments include molding a valve consisting of two materials that do not bond such that the valve portion is created in a dedicated area between the two materials.

In some embodiments, a valve can consist of at least two materials that do not bond. The valve portion can be created in a dedicated area between the two materials and include a mechanical bonding in at least one area of the valve to ensure that the valve remains in tact when in use.

Embodiments of the present invention include a valve having at least one material having a locking feature built into the valve. The locking feature can keep the valve structure in place and lock by means of the valve's own structure when the valve is reversed into its sealing position.

Further embodiments include a third molding or an applied pressure in the assembly of valve positions. The third molding can be, for example, a valve arm made of a substantially rigid material.

Yet even further embodiments include an apparatus and/or a mold comprising at least one core and/or cavity having a geometry capable of bending and/or reversing a previously molded or externally manufactured part. The apparatus can be inserted into a substantially rigid plastic and a membrane material, for example, elastomer, rubber or silicone, can be molded to at least one sealing area of the valve.

Other embodiments can include an apparatus and/or a mold comprising at least one core and/or cavity having a geometry capable of bending and/or reversing a previously molded or externally manufactured part. The apparatus can be inserted into a substantially rigid plastic, and a membrane material, for example, elastomer, rubber or silicone can be molded to at least two sealing areas of the valve. The sealing areas can be connected when being filled with the same material, but the sealing areas are not connected for sealing during the molding.

The above described embodiments can be incorporated into a valve in accordance with the present invention alone or in combination to create a valve with sealing properties superior to those known by persons of skill in the art. Such valves can be incorporated into a wide variety of products as explained above.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed:

1. A method for the production of a petal valve comprising:
   molding a petal valve in an open position;
   using a substantially rigid skeleton to reverse at least petals of the petal valve to a closed position; and
   affixing the substantially rigid skeleton onto the petal valve, wherein the substantially rigid skeleton keeps the petal valve in the closed position, and wherein the open position is inside out relative to the closed position.

2. The method of claim 1 further comprising configuring the petals of the petal valve when the petal valve is in the open position.

3. The method of claim 2 wherein configuring the petals of the petal valve comprises molding the petals of the petal valves to have a larger sealing surface than a wall thickness of a body of the petal valve.

4. The method of claim 1 wherein affixing the substantially rigid skeleton onto the petal valve comprises molding the rigid skeleton onto the petal valve.

5. The method of claim 4 wherein molding the rigid skeleton onto the petal valve includes overmolding the rigid skeleton onto the petal valve after molding the petal valve in the open position.

6. The method of claim 1 wherein using the substantially rigid skeleton to reverse the petal valve to the closed position includes the substantially rigid skeleton pushing the petal valve from the open position to the closed position.

7. A method for the production of a petal valve comprising:
   molding a petal valve in an open position;
   reversing at least petals of the petal valve to closed position; and
   affixing a skeletal structure, more rigid than the petal but flexible to allow the valve to open, comprising arms extending from the base, onto the petal valve, wherein the skeletal structure is to keep the petal valve in the closed position, and wherein the open position is inside out relative to the closed position, and wherein affixing the skeletal structure onto the petal valve includes molding the skeletal structure onto the petal valve by overmolding the skeletal structure onto the petal valve after molding the petal valve in the open position.

\* \* \* \* \*